July 9, 1929.　　　A. S. HOWELL　　　1,720,275
SPRING MOTOR
Filed Jan. 3, 1928
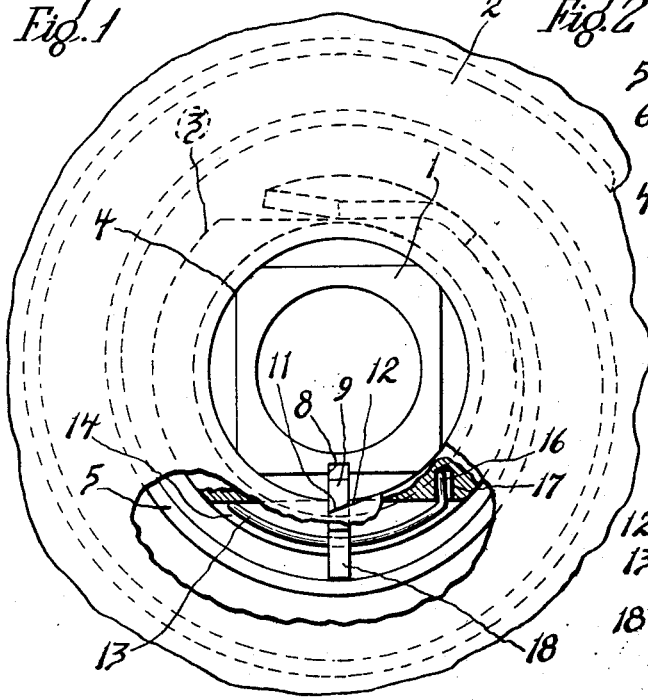
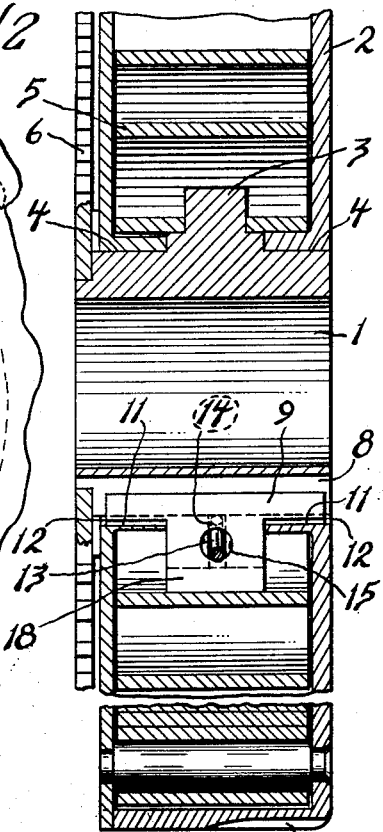
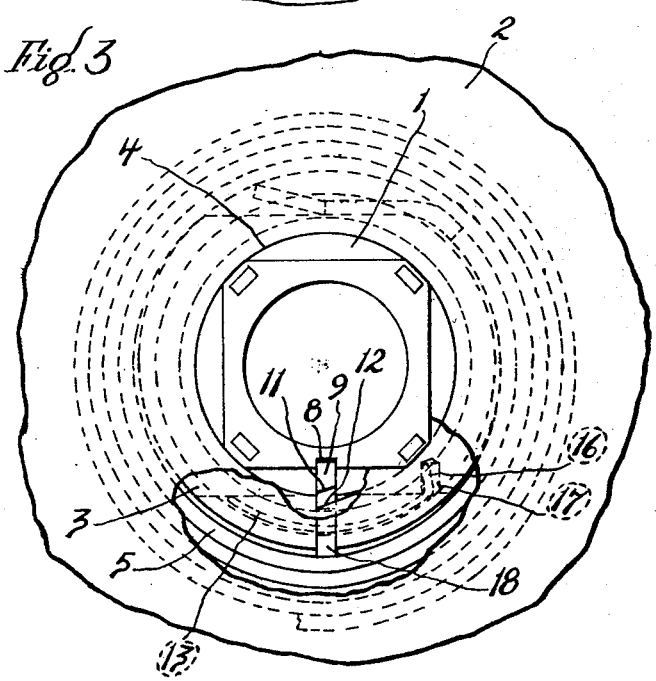
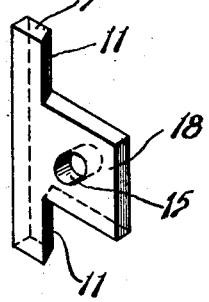
Inventor
Albert S. Howell
By Miehle & Miehle,
Attorneys.

Patented July 9, 1929.

1,720,275

UNITED STATES PATENT OFFICE.

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS.

SPRING MOTOR.

Application filed January 3, 1928. Serial No. 244,174.

My invention relates particularly to the motors of spring driven motion picture cameras and has for its general object the provision of a simple, compact, and effective means for preventing excessive unwinding of a spring motor, and particularly with a view toward the provision of such a means adapted to a spring motor of the type disclosed and claimed in my co-pending application for U. S. Letters Patent, Serial No. 132,475, filed August 30, 1926, for improvement in motion picture camera and the like.

The invention will be better understood by reference to the accompanying drawing, in which—

Figure 1 is a partial side elevation of a spring motor embodying my invention with parts broken away;

Figure 2 is a partial central section thereof;

Figure 3 is a view similar to Figure 1 with parts shown in different positions than those in which they are shown in Figure 1; and Figure 4 is a perspective view of one of the parts of the mechanism, hereinafter described.

Like characters of reference indicate like parts in the several views.

Referring to the drawing, 1 designates a revoluble hub which is rotatably mounted in a suitable manner unnecessary to be described. See Figures 1, 2, and 3. A circular spring housing 2 is provided with a flanged central bore by means of which the housing is journaled on the exterior of the hub 1 on opposite sides of an intermediate exterior enlargement 3 of the hub, as designated at 4. Disposed within the spring housing 2 is a spiral power spring 5 which has its inner end secured to the enlargement 3 of the hub and its outer end secured to the housing 2 in a suitable manner unnecessary to be described.

The spring 5 is wound by rotation of the hub 1 in the proper direction, an automatic check mechanism, not shown, preventing rotation of the hub 1 in the opposite direction to unwind the spring through a gear 6 rotatably secured with the hub 1 at one side of the housing 2. The energy of the spring 5 is expended by rotation thereby of the housing 2 which drives by means of gear teeth 7 on the periphery of the housing. See Figure 2.

The hub 1 is provided with a longitudinally extending radial slot 8 extending inwardly from the periphery thereof, and a ratchet plate 9 extends longitudinally of and is engaged in the slot 8 for rotation with the hub 1 and for radial movement with respect thereto. The end portions of the outer longitudinal edge of the plate 9 are beveled, as designated at 11 in Figure 4, and are engageable in the outer position of the plate with a corresponding longitudinally extending ratchet slot 12 in the bore of the housing 2 to stop rotation of the housing with respect to the hub 1 whereby to prevent unwinding of the power spring 5. A bow spring 13 is disposed in a chordal slot 14 in the enlargement 3 of the hub 1 and has its intermediate portion passing through an intermediately disposed aperture 15 in the ratchet plate 9 to yieldably urge the ratchet plate into engagement with the ratchet slot 12 of the housing 2, one end of the spring 13 being angled as designated at 16 and engaged in a transverse bore 17 in the hub 1 to longitudinally position this spring.

The ratchet plate 9 in its movement radially of the hub 1 is engageable and disengageable with the ratchet slot 12 of the housing 2, the spring 13 yieldably urging the ratchet plate outwardly into such engagement. The intermediate portion of the plate 9 is extended outwardly between the spaced bore portions of the housing 2, as designated at 18, and is engaged with the inner surface of the inner convolution of the power spring 5, which it will be observed displaces radially with winding and unwinding of this spring. The arrangement is such that throughout a range of unwinding of the power spring 5 the inner convolution of this spring, acting upon the ratchet plate 9 through the extension 18 thereof, holds the ratchet plate in an inner radial position against the influence of the spring 13 and out of engagement with the ratchet slot 12 of the housing 2, with the result that the housing 2 may be rotated by the spring 5. See Figures 1 and 2. As the spring 5 unwinds the inner convolution of the spring displaces radially outward, thus permitting the spring 13 to move the ratchet plate outwardly until at the end of said range of unwinding of the spring 5 the ratchet plate 9 engages the ratchet slot 12 to stop rotation of the housing 2 with respect to the hub 1 and consequently unwinding of the spring 5. See Figure 3.

Thus is excess unwinding of the power spring stopped by means responsive to displacement of the power spring as it winds and unwinds, it being observed that the stop mechanism is compact, simple, effective, and well adapted for the type of spring motor shown.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a spring motor the combination with a spiral spring motor, of means responsive to radial displacement of an inner portion of the spring of the motor as the spring unwinds for stopping excess unwinding thereof.

2. In a spring motor the combination with a spiral spring motor, of ratchet means for stopping unwinding of the spring of the motor, and means under control of displacement of an inner portion of the spring as it winds and unwinds and adapted to prevent functioning of said ratchet means throughout a range of unwinding of the spring and to effect functioning of said ratchet means at the termination of said unwinding range.

3. In a spring motor the combination with a spring motor including two coaxial independently revoluble members and a power spring having its ends secured with respective members thereof, of a stop member carried by one of said members for movement into and out of engagement with a stop formation on the other revoluble member to stop unwinding of the spring, and means under control of displacement of the power spring as it winds and unwinds and adapted to prevent engagement of said stop member with said stop formation throughout a range of unwinding of the spring and to effect engagement of said stop member with said stop formation at the termination of said unwinding range.

4. In a spring motor the combination with a spring motor including two coaxial independently revoluble members and a spiral power spring having its ends secured with respective of said members of a ratchet stop member carried by one of said revoluble members for movement out of and into engagement with a corresponding ratchet stop formation on the other revoluble member to stop unwinding of the power spring, a second spring yieldably urging said stop member into engagement with said stop formation, and a portion on said stop member engaging an inner portion of said power spring to move said stop member in the direction to disengage said stop formation as said inner portion displaces radially with winding of the power spring.

5. In a spring motor the combination with a spring motor including a revoluble hub member, a second member revoluble independently of said hub member and disposed coaxially therewith, and a spiral power spring having its ends secured with respective of said members, of a ratchet stop member rotatably fixed with said hub member and movable radially with respect thereto out of and into engagement with a corresponding ratchet stop formation on said second revoluble member to stop unwinding of the power spring, a second spring yieldably urging said stop member into engagement with said stop formation, and a portion of said stop member engaging the inner convolution of said power spring to move said stop member in the direction to disengage said stop formation as said convolution displaces radially with winding of the power spring.

6. In a spring motor the combination with a spring motor including a revoluble hub member provided with an intermediate circumferential enlargement, a coaxially bored circular housing member revolubly mounted by means of said bore on said hub member on opposite sides of said enlargement, and a spiral power spring disposed in said housing member and surrounding said enlargement and having its ends secured with respective of said members, of a ratchet stop member extending longitudinally of and engaged in a longitudinally extending radial slot in said hub member and extending inwardly from the periphery thereof for movement radially of the hub out of and into engagement with a corresponding longitudinally extending ratchet slot in the bore of said housing member to stop unwinding of the power spring, a bow spring disposed in a chordal slot in said enlargement of said hub member extending inwardly from the periphery thereof and passing through an intermediate aperture in said ratchet member for yieldably urging said stop member into engagement with said stop formation and having an end thereof angled and projecting inwardly into a transverse bore of the hub member, and an intermediate outwardly extending projection on said stop member and engaging the inner convolution of said power spring to move said stop member in the direction to disengage said stop formation as said inner convolution displaces radially with winding of the power spring.

In witness whereof I hereunto affix my signature this 29th day of December, 1927.

ALBERT S. HOWELL.